United States Patent
Leidecker et al.

[19]

[11] Patent Number: 6,109,401
[45] Date of Patent: Aug. 29, 2000

[54] LIGHT-WEIGHT DISC BRAKE

[75] Inventors: Hans-Dieter Leidecker, Frankfurt; Rolf Weiler, Eppstein, both of Germany

[73] Assignee: ITT Manufacturing Enterprises Inc., Wilmington, Del.

[21] Appl. No.: 08/894,171

[22] PCT Filed: Feb. 14, 1996

[86] PCT No.: PCT/EP96/00618

§ 371 Date: Nov. 17, 1997

§ 102(e) Date: Nov. 17, 1997

[87] PCT Pub. No.: WO96/25608

PCT Pub. Date: Aug. 22, 1996

[30] Foreign Application Priority Data

Feb. 15, 1995 [DE] Germany .......................... 195 05 013

[51] Int. Cl.[7] .............................. B60T 11/00; F16D 55/00
[52] U.S. Cl. .......................................... 188/370; 188/71.1
[58] Field of Search .................................. 188/71.1, 72.1, 188/72.4, 73.1, 73.31, 73.39, 73.41–73.47, 369, 370; 192/107 R, 107 M

[56] References Cited

U.S. PATENT DOCUMENTS

| 3,882,972 | 5/1975 | Newstead et al. ..................... 188/72.5 |
| 3,895,693 | 7/1975 | Lucien et al. .......................... 188/71.1 |
| 4,344,511 | 8/1982 | Stoka et al. ............................. 188/370 |
| 4,383,594 | 5/1983 | Cornell et al. ......................... 188/71.5 |
| 5,105,917 | 4/1992 | Sporzyuski et al. .................... 188/370 |
| 5,257,679 | 11/1993 | Weiler et al. ........................ 188/73.32 |
| 5,437,352 | 8/1995 | Hauker ................................. 188/71.5 |
| 5,472,068 | 12/1995 | Weiler et al. ........................ 188/73.44 |
| 5,727,659 | 3/1998 | Brown et al. ........................ 188/73.36 |

FOREIGN PATENT DOCUMENTS

| 14 80 028 | 5/1969 | Germany . |
| 30 22 262 | 12/1980 | Germany . |
| 29 01 243 | 10/1983 | Germany . |
| 38 03 957 | 8/1989 | Germany . |
| 38-33-553 | 8/1989 | Germany . |
| 2 132 713 | 7/1984 | United Kingdom . |
| 92/08908 | 5/1992 | WIPO . |
| 92/17712 | 10/1992 | WIPO . |

Primary Examiner—Chris Schwartz
Attorney, Agent, or Firm—Rader, Fishman & Grauer PLLC

[57] ABSTRACT

The brake shoes of a disc brake having a light-metal housing are supported in a circumferential direction and are axially slidable on supports which are fixed to the housing and made of a high-strength material. The supports are cast into the housing and supporting surfaces for the brake shoes are then shaped in a subsequent machining operation.

7 Claims, 1 Drawing Sheet

LIGHT-WEIGHT DISC BRAKE

BACKGROUND OF THE INVENTION

The present invention relates to a disc brake having a housing made of light metal.

German patent application No. 38 03 957 discloses a disc brake of this type. The prior art disc brake has a low-weight housing cast from aluminum. This is favorable especially with respect to reducing the unsprung masses on the vehicle wheel. A disadvantage of light-metal housings of this type is that corrosion and increased wear occurs at the points of support for the brake shoes. The reason is to be seen in the material of the brake shoe backing plates which almost exclusively consist of iron. Therefore, profiled rails are provided in the prior art disc brake on which the brake shoe backing plates are supported. The profiled rails are screwed to the housing. This type of attachment permits compensating for manufacturing tolerances because the profiled rails are adjusted within the limits of a predetermined clearance and, subsequently, may be fixed in the optimal position by the screws.

The problem of the brake shoe support in light-metal housings in the prior art disc brake is satisfactorily overcome as far as the technical function is concerned. However, the solution is very costly because profiled rails with a complicated shape are used, and the attachment by screws with a tolerance compensation also causes increased manufacturing costs.

SUMMARY OF THE INVENTION

An object of the present invention is to improve a disc brake having a light-metal housing so that a simple assembly which is inexpensive to manufacture is achieved especially with respect to the support of the brake shoes.

This object is achieved by casting in the supports fixed to the housing which are made of a high-strength material and provided to support the brake shoes already when casting the light-metal housing, and compensating for the tolerances, which occur in the manufacture, in a subsequent machining operation when the supporting surfaces for the brake shoes are shaped into the supports. In the disc brake according to the present invention, the machining operation for the supporting surfaces, which is also required in the state of the art disclosed in German patent application No. 38 03 957, is postponed until after the supports are attached in the housing. This renders it possible to cast the supports into the housing and to initially tolerate the occurring manufacturing tolerances which will be compensated in the subsequent machining operation. The effort needed in the state of the art for the adjustment of the supports is also eliminated in the disc brake according to the present invention. The proposed configuration of the supporting surfaces as cylinder segments arranged coaxially relative to a brake cylinder bore of the housing allows a subsequent machining of the housing in one machining operation with a cylindrical tool.

Favorable materials for the housing are aluminum or aluminum alloys. For the supports, stainless steel or titanium are appropriate.

The present invention can be implemented in a particularly favorable fashion in a disc brake as disclosed in German patent application No. 40 36 063. The prior art disc brake has a housing made of iron material wherein supports for the brake shoes are formed. After casting the housing, the supporting surfaces of the supports are favorably machined in one operation simultaneously with the manufacture of the brake cylinder bore. Preferred aspects of the present invention relate to a disc brake having a housing shape as disclosed in German patent application No. 40 36 063.

In simple embodiments of the present invention, which are especially inexpensive to achieve, the supports are configured as pins or as hollow tubular members for further weight reduction.

In a preferred aspect of the present invention, the supports themselves are supported by piled-up materials of the housing on the sides lying outwards in a circumferential direction. In this embodiment, the supports themselves may have a weaker design, with the result that material costs and weight are further reduced. The sole issue which is significant to the present invention is that the supporting surfaces for the brake shoes are made of a relatively non-abrasive and corrosion-resistant material.

At least one lateral surface or a hexagonal shape of the supports are favorable arrangements for the form-locking and unrotatable fixation of the supports in the brake housing.

One embodiment of the present invention will be explained in detail hereinbelow making reference to the accompanying drawing.

DETAILED DESCRIPTION OF THE DRAWING

Figure 1:
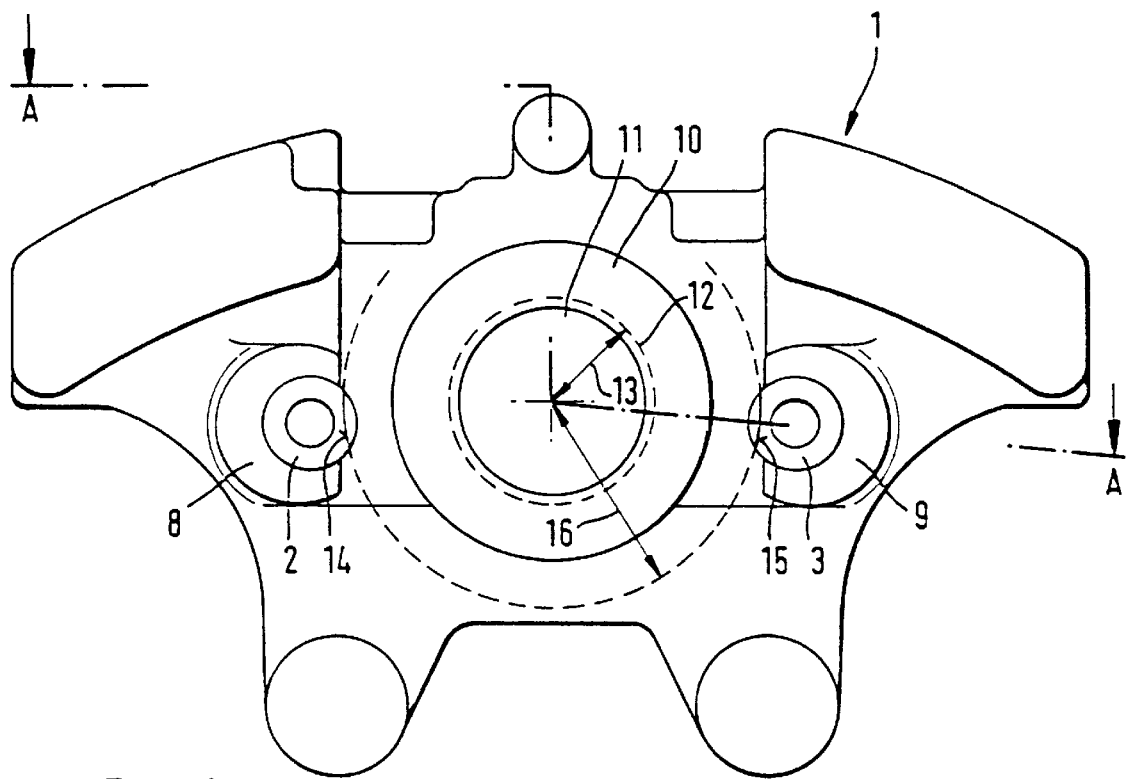
FIG. 1 is a lateral view of a housing blank for a disc brake according to the present invention.

A housing part 1 cast from aluminum is shown in the drawing. A blank in the condition in which it was cast is shown. Two supports 2, 3 of stainless steel are cast in the housing part 1. A brake shoe 4 can be supported on the supports 2, 3. In a preferred aspect of the present invention, the supports 2, 3 are made of titanium. Compared to supports made of stainless steel, this arrangement is favorable when the aluminum housing is treated in eloxal process.

Figure 2:
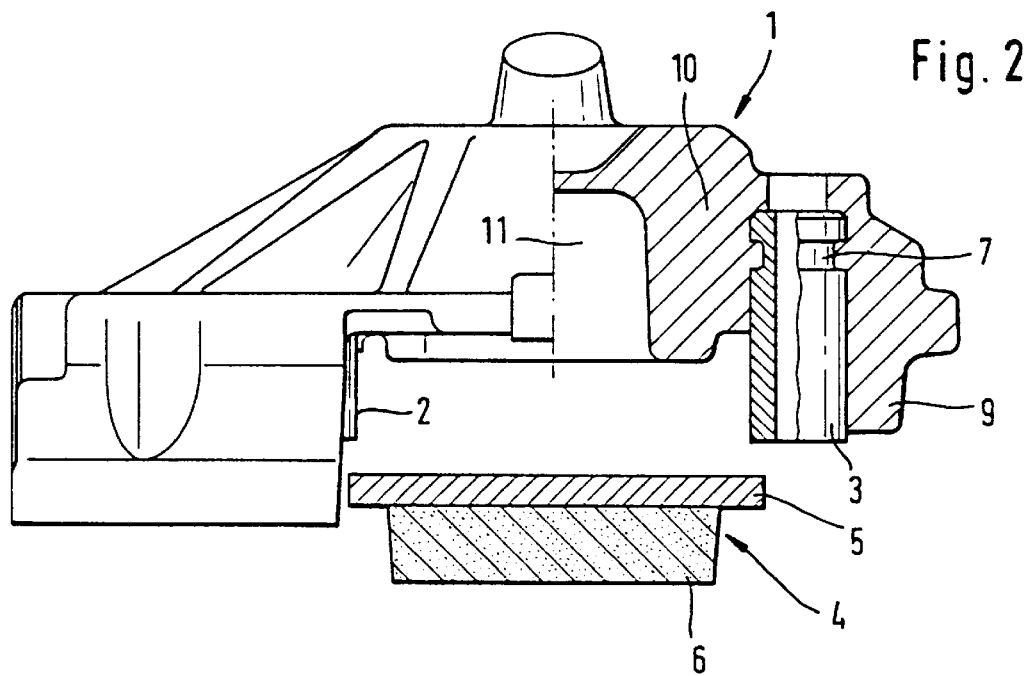
FIG. 2 is a partial cross-sectional top view of the same blank taken along line A—A in FIG. 1.

As can be seen in FIG. 2, the brake shoe 4 which includes a backing plate 5 and a friction lining 6 is shown in the non-assembled condition, because its mounting is not yet possible prior to the subsequent machining of the housing part 1.

The supports 2, 3 are configured as tubular members, each including an annular groove 7 for fixation in the material of the housing part 1. On the sides of the housing part 1 which are disposed outwardly in a circumferential direction, the supports 2, 3 in turn are supported by piled-up materials 8, 9 to achieve a higher load-carrying capacity for the circumferential forces which occur at the brake shoes 4 during braking. The housing blank further accommodates a brake cylinder 10 having a hollow space 11 intended for the later accommodation of the brake piston, which is not shown.

In a subsequent machining operation, a brake cylinder bore 12, shown in dotted lines in FIG. 1, is shaped in the hollow space 11 of the brake cylinder 10. The drilling tool used has a stepped design so that two supporting surfaces 14, 15 of the supports 2, 3 can be machined with the radius 16 apart from the brake cylinder bore 12 with the radius 13. Thus, the supporting surfaces 14, 15 of the supports 2, 3 have the shape of cylinder segments which are arranged coaxially relative to the brake cylinder bore 12 of the housing 1.

We claim:

1. A disc brake having a housing of light metal and including brake shoes, which are supported in a circumferential direction on supports of high-strength material fixed to the housing and which are slidable in an axial direction, wherein the supports are cast into the housing and include supporting surfaces each defined by a common radius, wherein said supporting surfaces are configured as segments of a common cylinder, wherein said cylinder is arranged coaxially relative to a brake cylinder bore of the housing wherein the supports are configured as tubular members.

2. The disc brake as claimed in claim 1, wherein the housing is made of aluminum or an aluminum alloy.

3. The disc brake as claimed in claim 1, wherein the supports are made of stainless steel.

4. The disc brake as claimed in claim 1, wherein the supports are made of titanium.

5. The disc brake as claimed in claim 1, wherein the supports are configured as pins.

6. The disc brake as claimed in claim 1, wherein the supports themselves are supported by piled-up materials of the housing on the sides which are disposed outwards relative to a brake shoe in a circumferential direction.

7. A disc brake having a housing of light metal and including brake shoes, which are supported in a circumferential direction on supports of high-strength material fixed to the housing and which are slidable in an axial direction, wherein the supports are cast into the housing and include supporting surfaces each defined by a common radius, wherein said supporting surfaces are configured as segments of a common cylinder, wherein said cylinder is arranged coaxially relative to a brake cylinder bore of the housing, wherein said supports are supported by piled-up materials of the housing on the sides which are disposed outwards relative to a brake shoe in a circumferential direction.

* * * * *